(12) United States Patent
Shaver (10) Patent No.: US 8,527,226 B2
(45) Date of Patent: Sep. 3, 2013

(54) SIGNAL MEASUREMENT APPARATUS AND BEAM MODULATION APPARATUS USED THEREIN

(75) Inventor: Jesse Shaver, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 732 days.

(21) Appl. No.: 12/714,806

(22) Filed: Mar. 1, 2010

(65) Prior Publication Data
US 2010/0220568 A1 Sep. 2, 2010

Related U.S. Application Data

(60) Provisional application No. 61/156,563, filed on Mar. 2, 2009.

(51) Int. Cl.
*G02B 26/06* (2006.01)

(52) U.S. Cl.
USPC ............... 702/72; 702/73; 702/191; 356/304; 356/310; 359/236; 359/237; 359/226.2

(58) Field of Classification Search
USPC ............. 702/69, 70, 72–74, 85, 90, 190, 191; 356/304, 305, 310, 323–325, 330, 455; 359/237, 196.1, 226.1, 226.2
See application file for complete search history.

(56) References Cited

U.S. PATENT DOCUMENTS

| | | | |
|---|---|---|---|
| 4,850,697 A | 7/1989 | Schoennauer et al. | |
| 6,215,575 B1 | 4/2001 | Tuchman | |
| 6,418,194 B1 | 7/2002 | McPherson et al. | |
| 6,937,331 B1 | 8/2005 | Nguyen | |
| 2003/0020642 A1 | 1/2003 | Ely et al. | |
| 2005/0011950 A1 | 1/2005 | Liedenbaum et al. | |
| 2005/0045091 A1 | 3/2005 | Kawasaki | |
| 2008/0043314 A1* | 2/2008 | Hagler | 359/237 |

FOREIGN PATENT DOCUMENTS
EP 0710830 B1 5/2005

OTHER PUBLICATIONS

Blair and Sydenham, "Phase sensitive detection as a means to recover signals buried in noise," J of Phys E: Scientific Instruments (1975) 8: 621-627.

Breitenbach, "Against spectral leakage," Measurement (1999) 25: 135-142.

(Continued)

*Primary Examiner* — Manuel L Barbee
(74) *Attorney, Agent, or Firm* — Novak Druce Connolly Bove + Quigg LLP; Eduardo J. Quinones (57) ABSTRACT

An apparatus for modulating an incident beam includes a body that is non-transmissive and rotatable about an axis perpendicular to a surface of the body. The body has a first set of features including transmissive features with respect to the incident beam along a first radial path at a first radial distance from the axis and a second set of features including data storage features along a second radial path at a second radial distance from the axis. The apparatus also includes a reference sensor disposed over a first position along the second radial path. In the apparatus. the radial distances are different and the numbers of transmissive features and data storage features are relatively prime. When the body is rotating, the first set of features modulate the incident beam and the reference sensor generates a reference signal based on the data storage features traversing the first position.

18 Claims, 6 Drawing Sheets

(56) References Cited

OTHER PUBLICATIONS

Chandley, "A simple technique for reducing the phase jitter of a light chopper," Infrared Phys. (1982) 22: 311-312.

Dicke, "The measurement of thermal radiation at microwave frequencies," The Review of Science Instruments (1946) 17(1): 268-275.

Doering and Harvey, "Optimal signal-to-noise in digital phase lock amplifiers," Applied Optics (1987) 26(4): 633-642.

Meade, "Advances in lock-in amplifiers," J Phys. E: Scientific Instruments (1982) 15: 395-403.

Pearce, "An optimum chopping," Nuclear Instruments and Methods (1972) 103: 435-436.

Wilmshurst, "Signal recovery from noise in electronic instrumentation," CRC Press (1990) ISBN 0750300582.

Zhang and Soukas, "Optimization of phase sensitive detectors using fast Fourier transform," Meas. Sci. Technol. (1991) 2: 13-18.

\* cited by examiner

SIGNAL MEASUREMENT APPARATUS AND BEAM MODULATION APPARATUS USED THEREIN

CROSS REFERENCE TO RELATED APPLICATIONS

This application claims the benefit of Provisional Application Ser. No. 61/156,563 entitled "SIGNAL MEASUREMENT APPARATUS AND BEAM MODULATION APPARATUS", filed Mar. 2, 2009, which is herein incorporated by reference in its entirety.

FIELD OF THE INVENTION

The invention relates to signal measurement, and more specifically to an apparatus for signal measurement and beam modulation and signal recovery devices used therein.

BACKGROUND

In general, a measurement result typically includes some portion or contribution attributable to the desired signal of interest, and some portion attributable to noise, jitter, and/or interference. Based on the magnitude of the signal of interest relative to the magnitude of noise, jitter, and/or interference, the sensitivity and accuracy of the measurement are limited. The measurand generally cannot be measured accurately if the signal-to-noise ratio (SNR) or signal-to-noise-plus-interference ratio (SNIR) is less than one. However, special techniques can be used to limit the effective bandwidth of the measurement process to regions where the signal is high and noise is low, thereby effectively increasing the signal-to-noise ratio and increasing the ability to extract the true value of the measurand from the noisy measurement result. For example, simple averaging can be used to increase the effective signal-to-noise ratio in some cases, especially in the case of white noise. Unfortunately, in many cases, the dominant noise is not white noise and simple averaging may not be effective. Therefore, more sophisticated techniques are generally needed to recover the signal.

A lock-in amplifier is commonly used to measure or extract the amplitude and phase of the measurand in a modulated signal that is accompanied by a significant amount of noise and/or interference. In general, lock-in amplifiers require modulated signals, and such modulation may be achieved by using a chopped incident beam. A lock-in amplifier makes use of a priori information describing the modulation of the signal, in the form of an internal reference signal or waveform corresponding to the modulation waveform of the signal, to recover or extract the signal from the noise. A lock-in amplifier mixes (multiplies point-by-point) the measured input signal with the internal reference signal waveform, and integrates the result of this process over a specified time interval, which can be chosen according to the signal and noise characteristics present in the system, the desired accuracy and precision of the measurement, and the time allowed for the measurement. The result of the integration may be seen as an essentially-DC signal which corresponds to the amplitude of the original signal before modulation. Contributions from any source of noise, interference, or perturbation that are not at the same frequency and/or phase as the internal reference signal are effectively cancelled, as the integrated result of the mixing process from these contributions will approach or tend toward a zero value. Offset or baseline errors in the signal measurement channel will also be eliminated, because the reference waveform has an average value of zero. Importantly, chopping and lock-in amplification allow for the reduction of 1/f noise which dominates many experimental systems at lower frequencies. By modulating the signal, the experimental system can be effectively removed from the region where 1/f noise sources dominate.

SUMMARY

Embodiments of the invention concern an apparatus for signal measurement and beam modulation and signal recovery devices used therein. In a first embodiment of the invention, an apparatus for modulating an incident beam is provided. The apparatus includes at least one body consisting of a composition that is non-transmissive with respect to the incident beam, the body being rotatable about an axis perpendicular to a surface of the body, the body having a first set of features and at least a second set of features on the surface, the first set of features includes one or more transmissive features with respect to the incident beam along a first radial path at a first radial distance from the axis, and the second set of features includes a plurality of data storage features along a second radial path at a second radial distance from the axis. The apparatus also includes at least one reference sensor disposed over a first position along the second radial path. In the apparatus, the first and the second radial distances are different and a number of the transmissive features and a number of the plurality of data storage features are relatively prime. Further, the first set of features modulate the incident beam when the body is rotating and the reference sensor is configured for generating a reference signal based on at least a portion of the plurality of data storage features traversing the first position when the body is rotating.

In a second embodiment of the invention, a signal measurement apparatus is provided. The apparatus includes at least one body consisting of a composition that is non-transmissive with respect to the incident beam, where the body is rotatable about an axis perpendicular to a surface of the body and has a first set of features and at least a second set of features on the surface. In the body, the first set of features includes one or more transmissive features with respect to the incident beam along a first radial path at a first radial distance from the axis and the second set of features includes a plurality of data storage features along a second radial path at a second radial distance from the axis. The apparatus also includes at least one reference sensor disposed over a first position along the second radial path, at least one beam input device for sampling the modulated beam, and at least one digital signal processing device for calculating at least one of a magnitude and a phase of the signal component of the incident beam based on the modulated beam and a reference signal. In the apparatus, the first and the second radial distances are different and a number of the transmissive features and a number of the plurality of data storage features are relatively prime. Further, the first set of features modulate the incident beam when the body is rotating and the reference sensor is configured for generating the reference signal based on at least a portion of the plurality of data storage features traversing the first position when the body is rotating.

In a third embodiment of the invention, a method of operating a signal measurement apparatus is provided. The apparatus includes at least one rotatable body having a first set of features traveling in a first radial path at a first radial distance for modulating an incident beam and at least a second set of features traveling in a second radial path at a second radial distance, at least one reference sensor disposed over a first position along the second radial path to generate a reference signal based on the second features and, at least one beam input device for sampling a modulated incident beam. The method includes the steps of rotating the body at a first frequency to generate a first modulated beam and a first reference signal, sampling a portion the first modulated beam at the beam input device based on the first reference signal, and generating a modulation waveform based on the portion of first modulated beam and the first reference signal. The method further includes the steps of rotating the body at a second frequency to generate a second modulated beam and a second reference signal, sampling a portion the second modulated beam at the beam input device based on the second reference signal, and computing a phase and magnitude of the second modulated signal based at least on the portion of the second modulated beam and the modulation waveform. In the method, the first and the second radial distances are selected to be different and a number of the transmissive features and a number of the plurality of data storage features are selected to be relatively prime.

DETAILED DESCRIPTION

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts can occur in different orders and/or concurrently with other acts or events. Furthermore, not all illustrated acts or events are required to implement a methodology in accordance with the invention.

As previously described, one of the main difficulties is signal measurement and signal recovery is the reduction or removal of the effects of noise, jitter, and/or interference from a signal being measured or recovered. As previously described, conventional lock-in amplifiers operate by mixing or point-by-point multiplication of an internal reference signal with the measured signal to extract the components of the measured signal having a same frequency and/or phase as the reference signal. Typically, this multiplication can be performed with either analog electronic components or with a digital electronic processor that multiplies the internal reference waveform with numeric representations of the measured signal that are produced by analog to digital conversion of the input signal. If the mixing or multiplication function is performed using analog electronic components, then the amplifier is generally described as an analog lock-in amplifier. If the mixing or multiplication is performed using digital numeric representations of the measured signal and internal reference waveform, then the amplifier is generally described as a digital lock-in amplifier. In the case of an analog lock-in amplifier, several sources of error are generally present, including errors due to amplifier drift, offset, gain, duty cycle errors, and the limited linearity and precision of analog multiplication techniques, particularly when a significant noise component accompanies the input signal.

In contrast, digital multiplication itself is generally error-free and drift-free, and can be performed with arbitrarily high precision given sufficient computing resources. Therefore, the measurement accuracy, precision, and sensitivity characteristics of a digital lock-in amplifier are determined by the accuracy and precision of the analog to digital conversion of the input signal, as well as the accuracy and precision of the numeric representation of the modulated signal which serves as the internal reference waveform, judged against the conventional of the waveform of the modulated signal itself under the conditions of measurement.

Another limitation of lock-in amplifier performance is the ability to eliminate or compensate for the effects of interference, and particularly, coherent interference. This limitation often determines the lower limit of detection for high-performance lock-in amplifier systems. Coherent interference cannot be eliminated by simply increasing the measurement time period, since the interference signal will be present regardless of the interval chosen.

Additionally, conventional rotating disk beam choppers used with conventional lock-in amplifiers are predisposed to several types of errors leading to noise or error in the final measurement result. Because of the limited precision and accuracy of any given chopper disk fabrication technique, the chopper disk will invariably have small imperfections and non-uniformities in the shape and spacing of the blades, compared to the intended or ideal form. This can cause the modulation waveform to have a duty cycle ratio different from the ratio that was intended and cause errors in the modulated waveform. These physical imperfections can also cause jitter to occur between the waveform of the actual beam modulation achieved and the waveforms of measured external reference signals since the reference signals will be measured under different conditions. Furthermore, imperfections of conventional rotary mechanisms typically introduce non-uniformity or irregularity into the motion achieved. The resulting irregularity of the disk motion, which can be random and/or deterministic, can occur on a spatial and/or temporal frequency which is much higher than the bandwidth of the external reference signal system or any control loop which governs the motion. Closed-loop control of the rotary motion of the chopper allows for roughly-stable frequency and phase over time, but the ability of the loop to sense and correct these variations within each cycle and between cycles will ultimately depend upon the accuracy, precision, and resolution of the feedback sensing system and the control loop bandwidth.

These imperfections and non-uniformities in the disk can create a complex source of timing error and jitter between cycles of the beam modulation waveform, the measured external reference signals, and any other signals derived from these. For example, if the chopper motor is being driven by a control loop attempting to synchronize the phase and frequency of the modulation waveform to an external oscillator, imperfections in the chopper disk or rotary mechanism will similarly cause jitter between the external oscillator, the reference signal, and the achieved modulation waveform.

Since many sources of error are potentially introduced by irregular chopper blade geometry and irregular chopper disk rotary motion, much emphasis is placed on these two properties during chopper disk fabrication. As a result, chopper disks intended for precise work are often very expensive, due to the requirements placed on precision geometry. Likewise, chopper motors, as well as the drive and control electronics, must be of the highest quality.

Despite the precautions that are taken during chopper disk fabrication, imperfections in the chopper geometry and motion are generally present in most, if not all, choppers. The effects of these imperfections are most evident in choppers intended for high modulation frequencies. These choppers have a higher number of narrow blades and apertures compared to disks used for low-frequency modulation. The smaller disk blade geometry results in greater relative errors compared to the ideal blade geometry, due to the finite precision of any given disk fabrication technique. For example, if a photochemical etching technique has an absolute precision tolerance of two microns in the lateral patterning dimension and the chopper's entrance aperture is one centimeter in diameter, then the precision of the disk is about one part in five thousand. If the same etching technique is used to make a disk intended for a smaller entrance aperture of five hundred microns, the precision is then only one part in two-hundred fifty.

In addition to jitter limitations, conventional lock-in amplifiers are typically limited in the types of internal reference signals or waveforms they can utilize for demodulation or phase-sensitive detection in the mixer. For example, in conventional lock-in amplifiers, the internal reference waveforms are typically limited to either sinusoidal waveforms or square waveforms, which can be selected by the user. This limitation is partly practical, and partly historical. When analog lock-in amplification was first invented, it was not yet possible to synthesize arbitrary waveforms of great precision, and analog multiplication of arbitrary waveforms was also error prone. However, at that time, it was possible to create analog sinusoidal waveforms of high precision, and it was possible to mix these waveforms using analog multiplication. It was also possible to perform square-wave demodulation. Early square-wave analog lock-in amplifiers used a pair of inverting and non-inverting amplifiers with closely-matched gain in order to achieve the effect of analog multiplication by a square wave. In later generations of digital lock-in amplifiers, these two basic waveforms, the square wave and the sine wave, have been preserved as basic options for the internal reference waveform. However, digital lock-in amplifiers can, in principle, use any waveform, subject to the restrictions on computing resources.

While a pure sinusoidal internal reference waveform generally has the narrowest possible bandwidth (i.e., the minimum information required to fully specify the waveform), it is not always the optimal waveform for a given measurement. This is because the modulated signal itself can generally have a more complex waveform, which places some of the modulated signal energy and information in several bins of spectral frequency. As a result, conventional lock-in amplifiers using pure sinusoid waveforms will potentially discard some portion of useful signal information. While the use of a more-optimal waveform is now possible using digital multiplication, current instruments provide no means to determine the shape of the optimal waveform.

Furthermore, conventional digital lock-in amplifiers are generally prone to errors due to the sub-optimality of various sampling techniques being used. This is generally governed by properties of the discrete Fourier transform, as well as number theory. In any discrete Fourier transform (DFT), several basic factors which depend upon the relation between signal components and sampling rates can complicate or corrupt the resultant spectrum. Three well-known effects of sub-optimal sampling are aliasing, leakage, and scalloping. All three effects are viewed as distinct sources of error, but all are related to numeric relations between the signal components, sampling frequency, and sampling block length.

To overcome the various limitations of conventional lock-in amplifier systems, embodiments of the invention provide a new system of signal modulation and lock-in amplification. In particular, the various embodiments of the invention provide a new type of beam modulation apparatus comprising a first set of beam-modulating features and a second set of reference signal-generating features, where the first and second sets of features are different. The reference signal can be used to determine a reference waveform for use in demodulation operations during lock-in measurements that may be obtained under conditions nearly identical to the actual measurement conditions.

In the various embodiments of the invention implementing such a signal modulation system, a significant improvement in the both the accuracy and precision of the numeric representation of the internal reference waveform is obtained as compared to conventional methods. Additionally, significant improvement is obtained in the accuracy and precision of the analog-to-digital conversion process. Furthermore embodiments of the invention result in a significant reduction of coherent interference effects. Embodiments of the invention also allow for use of a waveform that is weighted in order to improve the signal-to-noise ratio for a particular signal waveform and noise spectral distribution.

In the various embodiments of the invention, the first and second sets of features in the new beam modulation apparatus are configured to rotate together as a unit. This common rotation provides a simple mechanical phase lock between the signal generated from the higher-frequency reference-generating features and the signal modulated by beam modulating features. As a result of the mechanical phase lock, a more accurate system of phase-sensitive detection is possible without the need for a phase-lock loop (PLL) system in the lock-in amplifier.

The second set of reference-generating features can be used to provide a higher-frequency external reference signal suitable for characterization of the modulation performed by the beam-modulating features and for utilizing the measured beam modulation information during subsequent phase-sensitive detection. The waveform generated from these reference-signal generating features provides an over-sampled index for numerical representation of the modulation waveform of the beam, as detected by instrument during actual measurement of the weak signal. In the various embodiments of the invention, this numerical representation of the modulation waveform can be further processed to render it suitable for use as an internal reference waveform for phase-sensitive detection, such as in a lock-in amplifier. Therefore, the over-sampled internal reference waveform can be used to account for non-uniformity in the mechanical imprecision of the beam chopper or deviations in the flux distribution of the modulated beam. Similarly, the various embodiments of the invention can be used to generate an internal reference waveform that takes into account effects due to finite detector size, irregular detector shape, inhomogeneous detector performance, irregularities in fixed system apertures, errors due to diffraction, and errors due to scattering. Typically, each of these effects can compromise signal to noise in a given instrument.

In the various embodiments of the invention, the higher spatial frequency of the second set of features used to generate the external reference signal provides a high-frequency reference signal. This high frequency signal is suitable for direct use to trigger analog-to-digital (A/D) conversions at a rate near the maximum conversion rate for the A/D converter to be used in the system. Additionally, triggering sampling using a high-frequency reference signal generated from a feature that is mechanically fixed to the beam modulating features ensures that conditions of coherent sampling will be met. That is, no waveform discontinuities will be present between the beginning and the end of the sampled data block. Furthermore, if the second set of features provides an index pulse, then each pulse of the high reference frequency signal can be associated with a point of the modulation cycle waveform on a one-to-one basis. In this manner, an accurate representation of the actual modulation waveform achieved by the disk, including the effects of imperfections due to fabrication errors, can be measured. Since the information content of this numerical representation is proportional to the number of samples taken, over-sampling of the modulation waveform can be performed by using the maximum allowable frequency for the reference signal generation feature set, subject to the constraints of the maximum analog-to-digital conversion rate.

In the various embodiment of the invention, the number of samples taken can be assured to possess other properties by choosing the number of modulation cycles and the number of reference signal cycles in one cycle of the apparatus to be relatively-prime to one another. The term "relatively-prime", as used herein to describe the relationship between two integers, refers to two integers having no common factors other than 1. As result, by performing relatively-prime coherent sampling, reduced spectral leakage and windowing effects can be provided, without need for applying numerical windowing techniques. Additionally, the effects of quantization errors are statistically minimized, as each sampled point is as likely to be rounded up as to be rounded down. This is generally not the case for non-relatively-prime sampling arrangements.

The new beam modulation apparatus further provides a relatively straightforward means of reducing the effects of coherent interference originating within the measurement system, and for calculating optimal internal reference waveforms that compensate for imperfections in the modulation hardware, the incident beam, and other optical effects. In a conventional chopper and digital lock-in amplifier system, an external reference signal is typically generated by a sensor, such as an optical interrupt device, which is triggered by the chopper blades to give edge transitions. This external reference signal can then be used to generate an internal reference signal, typically based on look-up table techniques that utilize a PLL to determine the frequency and phase of the external reference signal, and use this information to select a pre-computed numeric value from a table of sine or cosine values. However, imperfections in the lock-in amplifier system will give rise to noise in the external reference signal, and this noise will cause errors in the process used to generate the internal reference signal. Furthermore, because the sampling clock and beam modulation system operate independently, true coherent sampling techniques are generally difficult to implement in conventional chopper and digital lock-in amplifier systems.

Figure 1A:
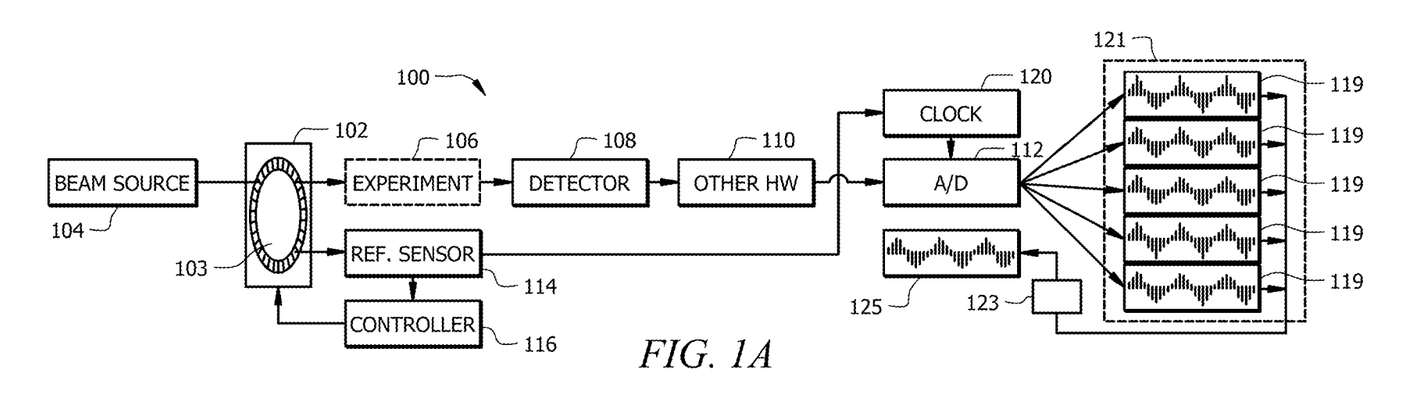
FIG. 1A is a schematic diagram of a lock-in amplifier system configured according to an embodiment of the invention operating in a modulation waveform measurement mode.
Figure 1B:
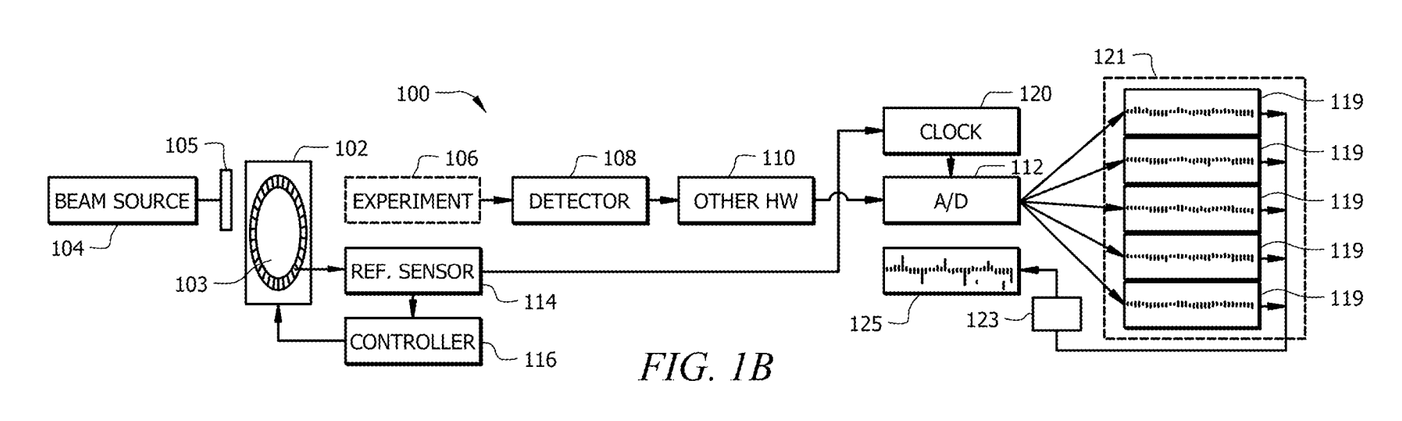
FIG. 1B is a schematic diagram of a lock-in amplifier system configured according to an embodiment of the invention operating in a coherent interference measurement mode.
Figure 1C:
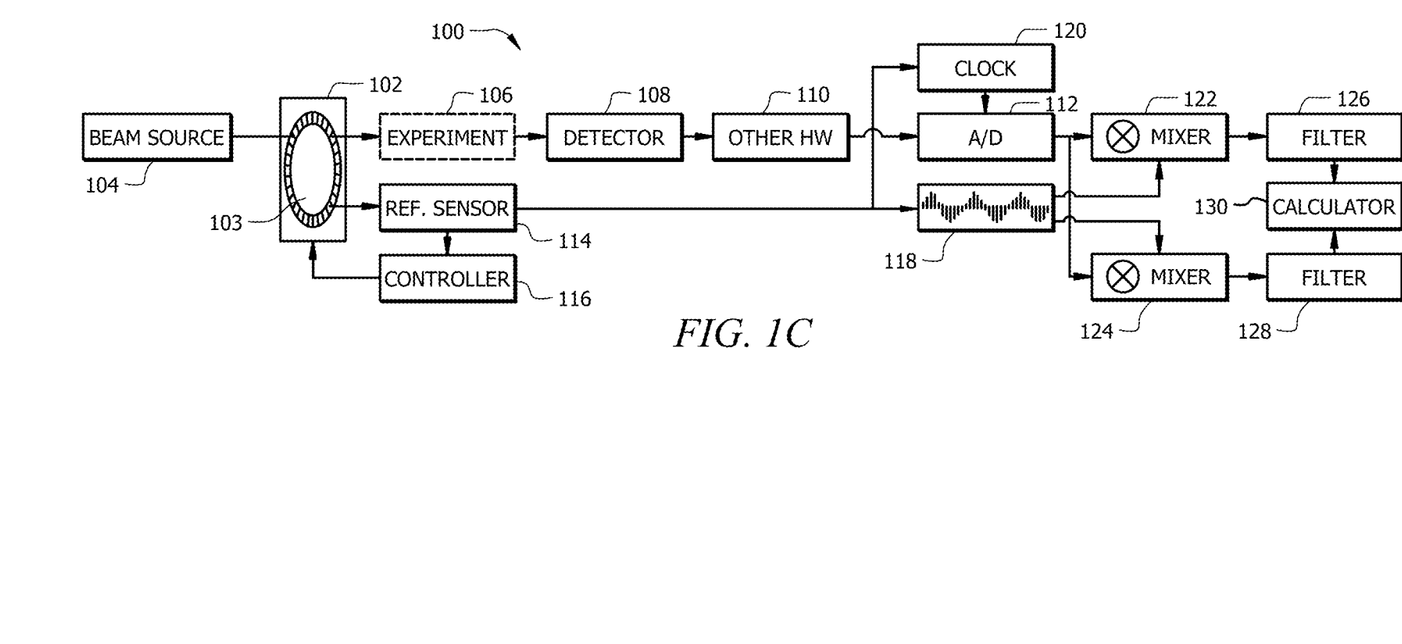
FIG. 1C is a schematic diagram of a lock-in amplifier system configured according to an embodiment of the invention operating in a signal measurement mode.

In contrast, such errors are generally limited in a chopper and digital lock-in amplifier configured according to the various embodiments of the invention. FIGS. 1A, 1B, and 1C depict an exemplary digital lock-in amplifier system 100 configured according to an embodiment of the invention during three modes of operation. These modes of operation, occurring at different time points, can be switched in an automated fashion according to an automated program of calibration and measurement steps.

As shown in FIGS. 1A, 1B, and 1C, the system 100 includes a beam modulating device 102 having beam modulating body 103 including a first and a second set of features. For example, beam modulating body 103 can comprise a rotating feature, such as a chopper wheel or disk, rotating in beam modulating device 102. Details of an exemplary beam modulating body will be described below with respect to FIG. 2. As the first and second features in beam modulating body 103 rotate, an incident beam from beam source 104 is modulated by the first set of features, typically a set of apertures having a first, known angular frequency and spacing. It is understood that this "known" angular frequency and spacing are the nominal, intended, or average frequency and spacing, and that irregularities in the features can exist, as previously described.

The modulated beam can be directed to beam detector 108 to generate a signal to be sampled. The resulting signal can be provided to A/D convertor 112 for sampling via one or more other hardware (HW) elements. At the same time, the second set of features of beam modulating body 103 are used with high-frequency-capable reference sensor 114 to generate the high-frequency reference signal for triggering A/D convertor 112, via clock circuit 120, to sample input signal associated with the beam.

The resulting coherent sampling allows for measurement of data blocks that do not require windowing, and are free from leakage, scalloping, and aliasing. The resulting absolute indexed sampling allows for the removal of a significant portion of the coherent interference and allows for weighting of the internal reference waveform to reflect any particular aspects of the spectral distribution of the ambient noise and non-coherent interference present in the environment. Furthermore, since direct triggering and indexing are performed, system 100 is able to operate without the need of a PLL system. Accordingly, the problems, expense, and performance limitations typically associated with a PLL system are reduced or eliminated. Additionally, non-random jitter due to the inevitable differences between the sensing of the reference signal and the actual beam modulation are now completely-removed, since the external reference itself is used to both characterize the modulation and apply the result of that characterization during signal measurement.

During the three modes of operation depicted in FIGS. 1A, 1B, 1C, a beam is depicted. Depending upon actual measurement conditions and constraints, this beam may be identical during each phase or mode of operation, or may be altered or substituted to satisfy certain constraints. For example, an amplifier system configured in accordance with an embodiment of the invention can be used as a detector subsystem in an optical absorption spectrophotometer that utilizes an incandescent lamp as the source for a beam. The output from this incandescent source can be spectrally filtered using an arrangement of an entrance slit, a dispersive element such as a grating, and an exit slit. The optical power of light exiting this spectral filter is generally less than the optical power of light entering the filter. If the output beam from this spectral filter is then regarded as beam source 104 depicted in FIG. 1A, the result of the low optical power of the light is that many cycles of measurement and averaging will be needed to characterize the modulation waveform of the disk to a specified numerical precision. However, it can be assumed that the modulation waveform is generally unaltered by such an operation, allowing the configuration of the beam source 104 to be modified during measurement of the modulation waveform, as depicted in FIG. 1A. For example, the entrance or exit slits may be enlarged, or the dispersive element may be replaced by a mirror during the mode of operation depicted in FIG. 1A. The advantage of changing the configuration of beam source 104 during this mode of operation is that a higher beam power can be used to characterize the modulation waveform using less time and fewer cycles of measurement and averaging.

In general, the time savings achieved by such an alteration in the beam source may be offset by the additional time, cost, or complexity of the system used to achieve the alteration, as well as the uncertainty that such substitution does not indeed alter the modulation waveform in a significant manner. Thus, it is generally unnecessary to alter operation of beam source 104 between the modes of operation depicted in FIGS. 1A, 1B, and 1C. However, the beam source is effectively blocked, shuttered, deflected, absorbed, or un-powered during measurement of the coherent interference, as depicted in element 105 FIG. 1B. In certain cases, mechanical blocking of the beam, rather than removing power from the beam source, can be necessary, because the beam source power supply can introduce interference into the system.

However, in other embodiments of the invention, the beam source 104 depicted in FIG. 1A can be a more powerful, yet more expensive beam source. Such a beam source is generally more suitable for use to quickly characterize the modulation waveform and calibrate the system during initial assembly, although too expensive to include with each unit in production. In such an embodiment, a different beam source 104 is used during measurement of coherent interference and during experimental measurement after the unit is installed, as depicted in FIG. 1B and FIG. 1C respectively.

As described above, the system 100 can be configured to perform signal measurement by operating in several modes. Initially, the system 100 can be operated to obtain a modulation waveform. FIG. 1A is a schematic diagram of a lock-in amplifier system configured according to an embodiment of the invention operating in a modulation waveform measurement mode. As shown in FIG. 1A, the beam from the beam source 104 is directed toward the beam modulation device 102 of the invention. In this mode of operation, beam modulation device 102 is used to modulate the beam at a selected lower frequency. This beam then passes through system or experiment 106 and the results pass onward toward detector apparatus 108. In general, system or experiment 106 and detector apparatus 108 are the same or similar as will be used during subsequent signal measurements. However, in some embodiments, these can be altered or substituted to save calibration time. In some cases, the alteration can be performed so as to not unduly increase costs or complexity or so not to add additional measurement uncertainty. The resultant signal is passed from detector apparatus 108 to A/D convertor 112, as described above.

At the same time, as described above, beam modulating body 103 and reference sensor 114 are utilized to produce a higher-frequency signal that is coherent in phase and relatively-prime in frequency to the modulation waveform. This signal can be supplied to clock circuit 120, which conditions the signal such that it is suitable for triggering relatively-prime coherent sampling. This sampling trigger signal can then be used to trigger capture of many samples 119 of the signal received at A/D convertor 112, indexed to specific phases of the modulation cycle of modulation device 102. Samples 119 can be stored in memory element 121. The results of these many measurements of the complete modulation cycle can then processed using processing element 123 to generate measured modulation waveform 125. For example, averaging, DC offset removal, and amplitude normalization can be performed by processing element 123. This result is stored memory element 121 or elsewhere for later use. Reference sensor 114 can also provide signals for controller 116 for stabilizing the modulation frequency of beam modulation device 102 about some selected frequency.

In some embodiments of the invention, the amount of coherent interference can be measured to provide additional compensation during signal measurement. This is conceptually illustrated in FIG. 1B. FIG. 1B is a schematic diagram of a lock-in amplifier system configured according to an embodiment of the invention operating in a coherent interference measurement mode. In coherent interference measurement mode, the system is configured in a manner similar to that which will be used in later experiments, as described above for FIG. 1A. However, as shown in FIG. 1B, the beam from beam source 104 is blocked by beam block 105. As a result, any electrical noise produced by the beam apparatus, such as arcing or power supply noise, is still present in the ambient environment, even though the beam itself is not allowed to reach the detector. Although, the beam source could be removed entirely, this also removes other sources of interference from the system which may need to be accounted for during a measurement.

In FIG. 1B, system 100 can operated as described above with respect to FIG. 1A for modulation waveform measurement mode, with the sampling triggered and sampling results 129 also indexed into memory element 121 according to the signal produced by high-frequency reference sensor 114. However, samples 129 will correspond to the measured coherent interference produced by the system during operation. Samples 129 can also be analyzed spectrally by processing element 123, in order to look for spectral relationships in the non-coherent sources of interference or noise, as might occur due to interference from the power grid or a source of white or 1/f noise within the system. The resulting coherent interference waveform 127 can then be used to further reduce offset in later operation of system 100. This can be achieved through several means, including direct subtraction of the measured coherent interference waveform 127 from measured modulation waveform 125, or subtraction of the DC value that results from mixing measured coherent interference waveform 127 and measured modulation waveform 125 during later signal measurement operations.

The spectrum of incoherent interference and noise measured during coherent interference measurement mode can also be used to modify measured modulation waveform 125 to produce a waveform that is optimal with respect to the signal and noise components in each discrete frequency bin, recognizing the fact that signal components add arithmetically while noise components add only in quadrature, due to their random phase relationships with the signal modulation waveform. One of ordinary skill in the art will recognize that these optimal weighting operations can be performed in the time or frequency domain, or other computational domains.

Once measured modulation waveform 125, and optionally measured coherent interference waveform 127, is obtained, signal measurement can be performed, as shown in FIG. 1C. FIG. 1C is a schematic diagram of a lock-in amplifier system configured according to an embodiment of the invention operating in a signal measurement mode. In FIG. 1C, sampling is triggered by a signal derived from the indexed high-frequency reference sensor 114. During the synchronous demodulation step, the values supplied to mixers 122 and 124 are supplied from a look-up table, and correspond to optimal internal reference waveform 118, which is a waveform that is derived from measured modulation waveform 125. The optimal internal reference waveform 118 can be corrected for effects of coherent interference, incoherent interference, and non-white noise distributions. This waveform is used as an input to the digital multipliers in mixers 124, 126 and the results are filtered by user-adjustable low pass filters 126 and 128. The resultant magnitude and phase results are obtained by magnitude and phase calculator 130.

Figure 2:
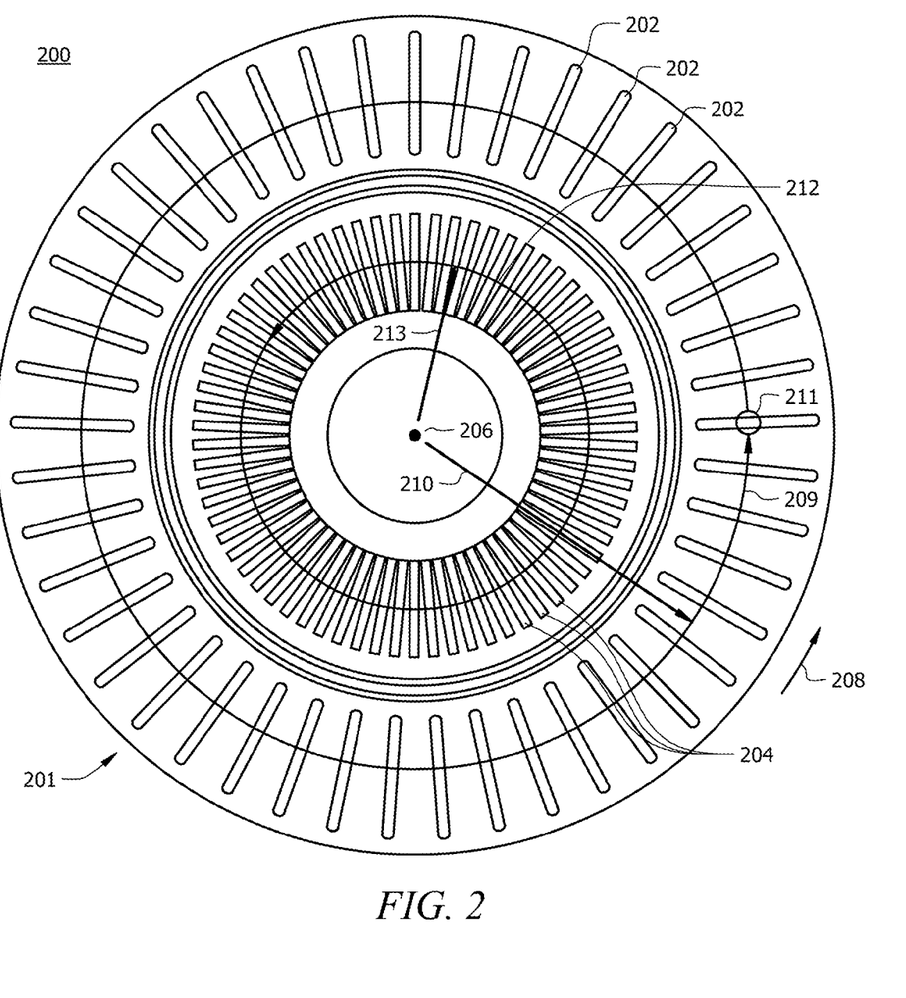
FIG. 2 shows a front view of an exemplary beam modulating body comprising a chopper wheel or disk, for a beam modulating device configured according to an embodiment of the invention.

As previously described, the beam modulation and the high frequency reference signals are generated in the various embodiments of the invention by utilizing two or more sets of different features on a beam modulating body. This is conceptually illustrated with respect to FIG. 2. FIG. 2 shows a front view of exemplary beam modulating body 200 for a beam modulating device configured according to an embodiment of the invention. As shown in FIG. 2, beam modulating body 200 can comprise at least one disk 201 including first set of features 202 and at least second set of features 204.

One of these sets of features can be used to modulate an incident beam, as described above with respect to FIGS. 1A and 1C. In disk 201 in FIG. 2, features 202 are configured as apertures of a first size and having a first angular frequency, such that when disk 201 rotates about radial axis 206 in direction 208, features 202 traverse first radial path 209 at first distance 211 from radial axis 206. Disk 201 can be constructed or fabrication from a composition that is non-transmissive with respect to the incident beam being modulated. As a result, the incident beam at position 210 along radial path 209 in will be modulated by the rotation of features 202 comprising features transmissive with respect to the incident beam. For example, features 202 can comprise apertures in the disk 201 or areas of a transmissive material with respect to the incident beam. The apertures will typically be spaced as uniformly as possible, and create a modulation duty cycle that is one-to-one, with on-time equal to off-time during operation. Any noise introduced into the system by uncertainty or imperfections is compensated by the use of indexed relatively-prime coherent sampling performed using a high frequency reference signal, as described above. For example, if the Nth feature spacing deviates from the ideal uniform spacing by a certain amount, this deviation will manifest as a fixed error which is present during the calibration modes as well as the measurement mode. Accordingly, such errors are automatically accounted for in the various embodiments of the invention.

The other set(s) of features can be used in the various embodiments of the invention to generate the high frequency reference signal, as described above. In disk 201, these are shown as second set of features 204 having a second angular frequency and spacing, such that when disk 201 rotates about axis 206 in direction 208, features 204 traverse second radial path 212 at second distance 213 from axis 206.

Although features 202 and features 204 are shown as being on the same disk, the embodiments of the invention are not limited in this regard. In the various embodiments of the invention, the features can be located on the same or different disks, provided that the disks are configured to rotate together about the same rotation axis. That is, the disks are mechanically coupled to rotate in unison. Such a configuration permits alternate arrangements for a beam modulation device to simplify design, to facilitate integration into an existing component, or to reduce construction costs. In such a configuration, a second disk including second features 204 can be configured to be non-overlapping with first features 202 to prevent interference with the modulated beam or an incident beam. Furthermore, such a design permits different combinations of beam-modulating features and reference features to be used. Such a configuration is described below with respect to FIGS. 3, 4, and 5.

In the various embodiments of the invention, second features 204 can comprise data storage features comprising one or more data storage elements. The physical locations of the data storage features can be used to denote or encode a point in the phase of the modulation cycle, rather than as a primary means of measurement data storage. That is, the data storage elements can be used to encode external reference signal phase information. In general, any type of storage elements can be used. For example, in some embodiments of the invention, the data storage elements can comprise apertures or transmissive features, for a reference sensor device configured as an optical pickup device sensing interruptions in a reading beam incident to disk 201 along the second radial path. In another example, the data elements can comprise a series of reflective features, stripes, characters, symbols, or any other type of indicia which can be read optically by a reference sensor configured as an optical reader device. Alternatively, the data elements can comprises a series of magnetic storage features readable by the reference sensor. In yet another example, the data elements can comprise radio-frequency (RF) tagged features that can be read by a RF tag reader. In still another example, the data elements can comprise one or more interferometric optical pits. These exemplary configurations are presented by way of example and not by way of limitation.

In the various embodiments of the invention, the number and type of phase or position-encoding features can vary, as can the scheme for encoding the phase or position. For example, the data stored in the data storage features can comprise absolute reference encoding values, indexed-incremental reference encoding values, or incremental encoding values. Absolute reference encoding values can be used for systems that may lose power intermittently during operation. In such systems, data gathered during the remaining portion of the cycle could still be used and stored in the proper location in memory according to the absolute reference signal. Incremental encoding values can be used in cases where low cost is desired and where power and throughput considerations do not necessitate an index. Indexed incremental encoder values provide a compromise, as they generally increase encoder resolution at a lower cost while still allowing for robust indexing of data to the proper location in memory in most operational settings.

As previously described, the number of features in first features 202 and second features 204 can be selected to improve sampling performance of a lock-in amplifier. The selection of relatively-prime numbers, as described above, guarantees the condition of coherent sampling, which minimizes spectral leakage and eliminates the need for windowing of the data. Additionally, if the index value is a base-2 number, mapping into memory storage hardware can be more efficient for both storage and data throughput, and further processing of the data using optimized fast-Fourier transforms will be simplified.

Furthermore, the impact of aliasing and scalloping losses can also be reduced through the use of selected relatively-prime numbers. Scalloping loss, also referred to as the "picket-fence" effect, is another source of error. That is, since a discrete Fourier transform (DFT) is in some respects similar to a bank of band-pass filters with the same shape and bandwidth, centered at discrete frequencies, and DFT is discrete, only the signal component frequencies which fall on the discrete points of the frequency transform are at their true value. The resulting frequency spectrum is thus similar to the true spectrum viewed through a picket fence. Signal components at frequencies which do not fall on exact multiples of the frequency resolution will be smeared across the two neighboring frequency bins. In the worst case, when a signal component is exactly halfway between two discrete frequency bins, the apparent spectral magnitude will be much lower than the actual magnitude. Accordingly, proper sampling is particularly important in the case of a signal accompanied by discrete interference. In this case, a sampling frequency can be chosen such that the signal and interference frequencies each fall directly into their own respective bins in a discrete Fourier transform.

Aliasing is the result of failing to meet the Nyquist criterion, which specifies that the sampling frequency should be greater than twice the highest signal component frequency. Therefore, in a system with only integral frequency components, if the highest integral frequency is N, then the sampling frequency must be at least 2N+1. However, in certain cases, this requirement can be tempered by coherent sampling of a repetitive waveform, such that different portions of the waveform are sampled during different cycles, and no part remains unmeasured. In general, conventional chopper-based systems are designed to greatly exceed the Nyquist criterion while satisfying other numerical relations as described.

In the various embodiments of the invention, the numerical relationships described above for the chopper disk generally assure that the Nyquist criterion is met without having to provide a large margin of oversampling in the design. Furthermore, scalloping losses are reduced or eliminated. An advantage of the sampling and synchronization in accordance with the various embodiments of the invention is that the absolute difference between the modulation frequency and the external reference signal frequency can be made quite large by design. In conventional optical beam choppers, the external reference signal is typically a large signal (5V) which is, by design, fixed in frequency and phase to the modulation achieved by the chopper. This external reference signal is transmitted from the chopper apparatus to the lock-in amplifier in a shielded cable. However, flaws in the shielding or poor design allow energy from the external reference signal to couple into the detector system, which is, by design, particularly sensitive to this frequency. Thus, it is generally unavoidable than an unfavorable source of coherent interference is present in a conventional chopper and lock-in amplifier system. In contrast, the external reference signal used in systems configured in accordance with an embodiment of the invention can operate at a frequency that is higher than the frequency bands to which the detector system is sensitive to. Thus, any coupling due to flaws in the shielding will be reduced or eliminated. Any residual coupling forms a weak source of coherent interference, which can be characterized and dealt with as described above.

To calibrate a measurement system configured according to an embodiment of the invention, such as that shown in FIG. 1A, using a disk arrangement such as that shown in FIG. 2, a very low-noise version of the actual beam modulation waveform can be measured using simple coherent averaging techniques, which collect and average the signal measurement result over many rotational cycles of the disk. The modulation, which is coherent with the indexed sampling, will accumulate with each revolution of the disk(s), while uncorrelated incoherent noise will tend to cancel out. The spectrum of the noise, as well as any sources of coherent interference, can also be measured in this way. The reference modulation waveform can be corrected for zero area under the curve over one full modulator cycle by adding or subtracting a constant to all sampled values. The amplitude can be corrected to give an arbitrary gain factor, and the waveform can also be spectrally weighted according to the measured noise spectrum. Thus, it is generally simple and straightforward to determine a reference waveform for the particular modulation, sensor, and ambient noise spectrum.

Although FIG. 2 illustrates a beam modulating body 200 comprising a disk 201, the invention is not limited in this regard. In some embodiments of the invention, the first and second sets of features can be formed on other types of beam modulating bodies rotating about any axis of rotation, provided that a the first and second set of features continue to travel along radial paths relative to the axis of rotation. For example, the features can be included in a beam modulating body attached to a cantilever, tuning fork, or other device for moving the beam modulating body. For calibration purposes, the cantilever position can be adjusted until the incident beam is modulated by a number of features on the beam modulating body commensurate with a revolution about a rotational axis.

Because sampling is triggered directly from the external reference signal without need for a PLL, coherent sampling at a rate that is relatively-prime to the modulation frequency is generally straightforward. It is also generally simple to guarantee that a full integer number of modulation cycles are recorded in the data block. In this way, sources of error due to properties of the discrete Fourier transform, such as aliasing, scalloping, and leakage, can be greatly minimized or eliminated entirely.

Figure 3:
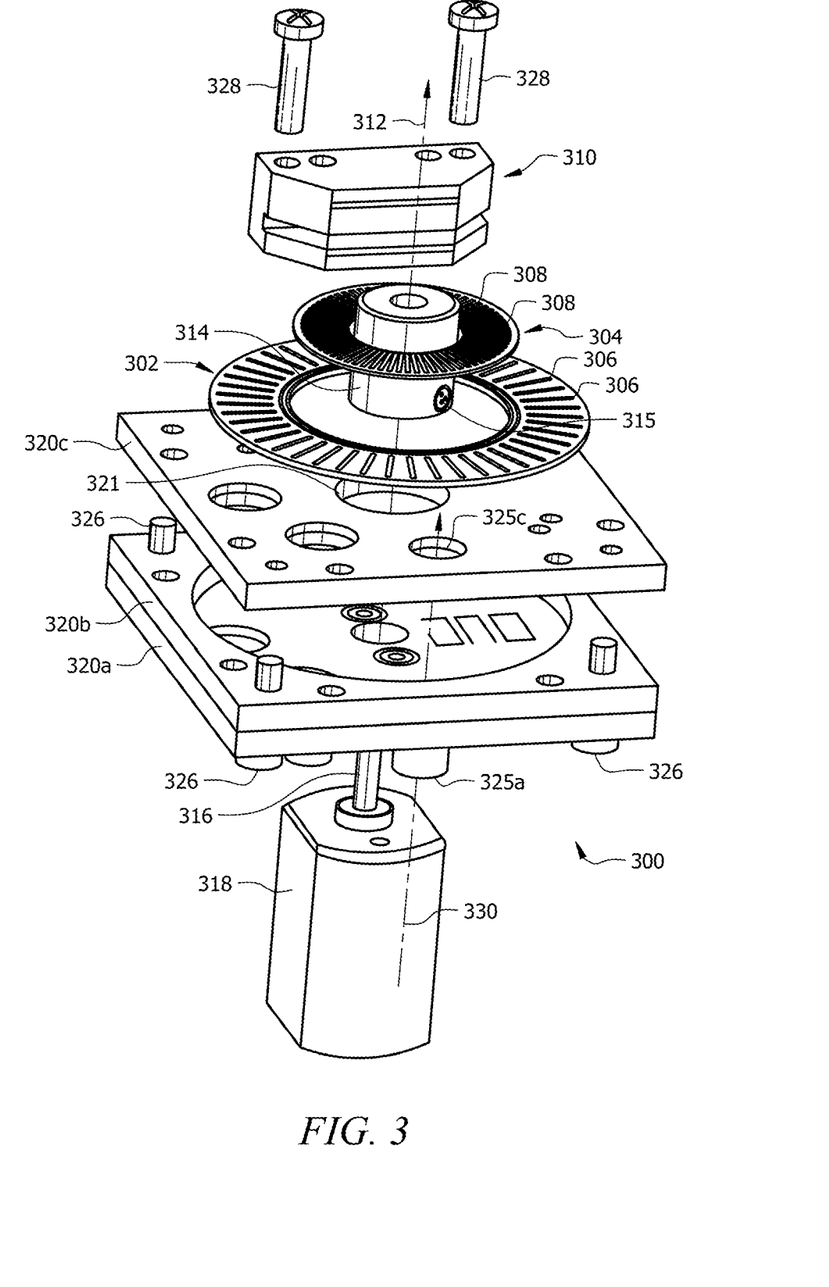
FIG. 3 shows an exploded view of a beam modulating device configured according to an embodiment of the invention.
Figure 4:
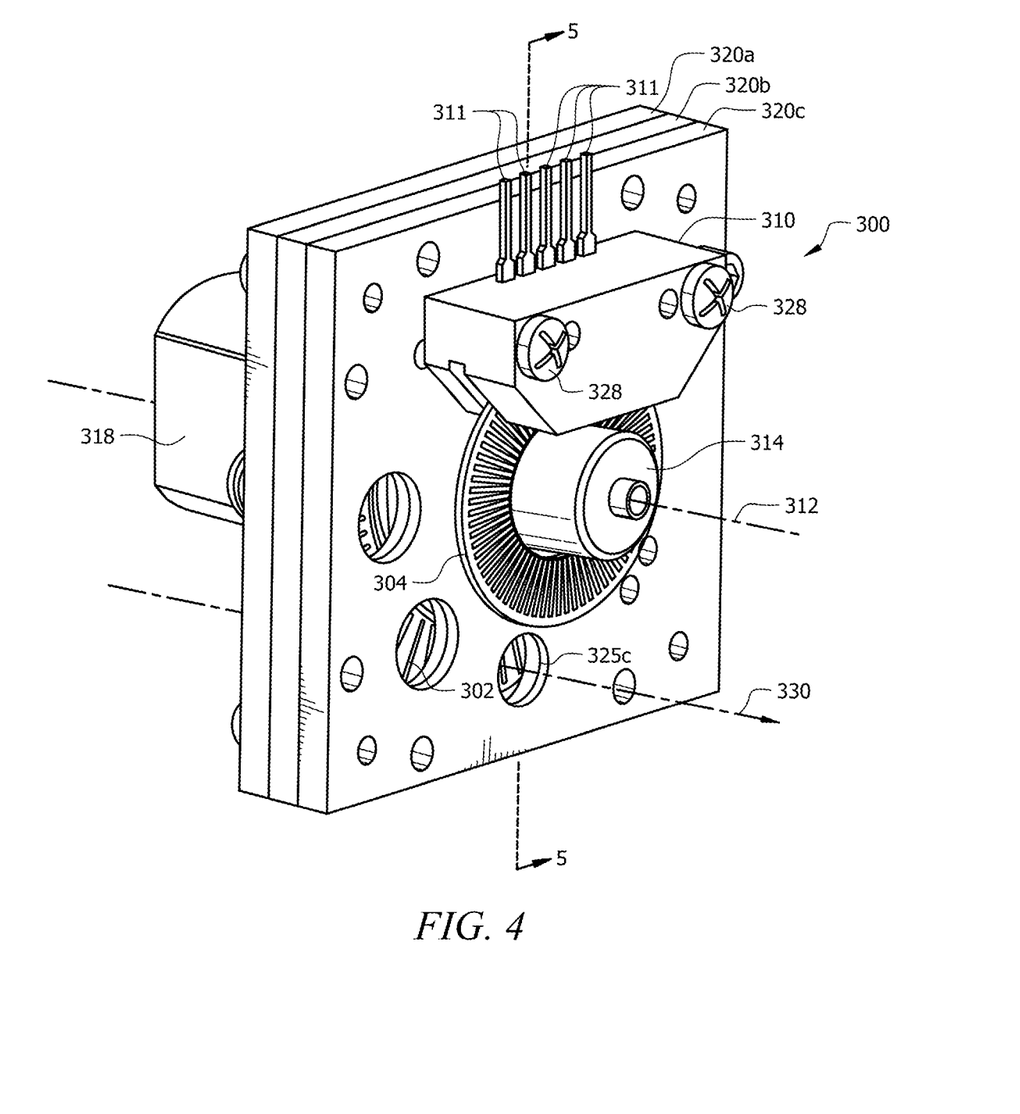
FIG. 4 shows a perspective view of the beam modulating device in FIG. 3 after assembly.
Figure 5:
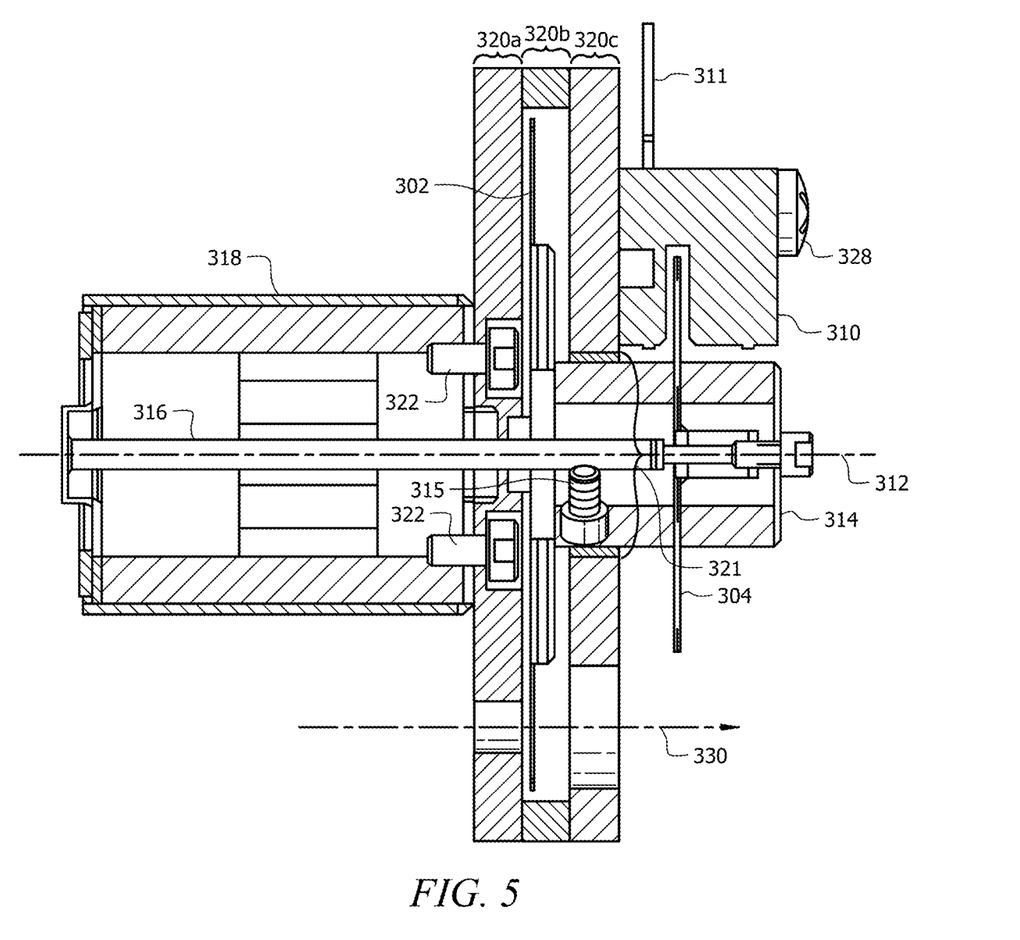
FIG. 5 shows a cross-section view of the beam modulating device in FIG. 4 along cutline 5-5.

FIGS. 3, 4, and 5 show various views of exemplary beam modulating device 300, configured according to an embodiment of the invention. Device 300 can be used, for example, as the beam modulating device in FIG. 1A, FIG. 1B, and FIG. 1C. FIG. 3 shows an exploded view of beam modulating device 300. FIG. 4 shows a perspective view of assembled beam modulating device 300. FIG. 5 shows a cross-section view of assembled beam modulating device 300 along cutline 5-5 in FIG. 4.

As shown in FIGS. 3, 4, and 5, exemplary device 300 can include optical chopper wheel or disk 302 and reference feature disk 304. Chopper disk 302 can include one or more features 306 for modulating an incident beam along beam path 330. Reference feature disk 304 can include one or more features 308 that can be detected by reference sensor 310 for generating a reference signal. Sensor 310 can include one or more leads 311, as shown in FIGS. 4 and 5, for directing the reference signal generated by the reference sensor to an external device. Features 306 and 308 both rotate about rotational axis 312. The common rotation for disks 302 and 304 is provided by mechanically coupling disks 302 and 304 using hub 314. Fastener 315 can be used to mechanically couple hub 314 to shaft 316, which is disposed along axis 312. The term "fastener", as used herein, refers to any type of device for holding two objects or parts together. Fasteners can include, by way of example and not by way of limitation, screws, bolts, studs, rivets, nails, snaps, glues, welds, melds, press-fittings, clamps, or hooks. Shaft 316 can be mechanically coupled to motor 318 configured to rotate shaft 316, thus causing disks 304 and 306 to rotate about axis 312.

The various components of exemplary device 300 can be mounted upon a series of plates 320a, 320b, and 320c to provide mechanical support for these various components, and to provide secure points of attachment to other structures. As shown in FIG. 5, first plate 320a is provided for mounting motor 318 using one or more fasteners 322. In exemplary device 300 in FIG. 3, chopper disk 302 sits between first plate 320a and third plate 320c in space 324 defined by the second plate 320b. Third plate 320c can also include hub opening 321. Hub 314 can be coupled to chopper disk 302 and can extend through hub opening 321. Reference disk 304 can then be coupled to the extending portion of hub 314, as shown in FIGS. 3-5. Additionally, first plate 320a and third plate 320c can include apertures 325a and 325c, respectively, coincident with spacing 324. Plates 320a, 320b, and 320c can be mechanically coupled using one or more fasteners 326. Reference sensor 310 can be mounted onto third plate 320a using one or more fasteners 328. Reference sensor 310 can be positioned on third plate 320c so as to sense features 308 on reference disk 304, but not to physically contact reference disk 304.

In operation, disks 302 and 304 rotate responsive to the action of motor 318 on shaft 316 and hub 314. As described above, an incident beam can be introduced along beam path 330 such that it impinges on features 306 of the optical disk 302 as the beam passes through aperture 325a, space 324, and aperture 325c. As the incident beam is modulated by features 306, reference sensor 310 senses features 308 on reference disk 304 and generates one or more reference signals via leads 311.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the invention.

One of the advantages of the invention is the reduced cost and complexity involved in the construction of the beam modulating device. For example, a beam modulation device for a measurement system was constructed a conventional-grade 16-bit digitizer board installed into a personal computer. In particular, a digitizer board capable of external sample triggering and up to 500 kilosamples per second on each of four channels was utilized. The detector apparatus was a 5-gigaohm photodiode transimpedance amplifier with a silicon photodiode detector. Conventional considerations for electronic shielding were taken. A chopper was constructed from a machined aluminum housing, a machined brass chopper wheel, a conventional low-cost DC brush-commutated motor, and a conventional indexed optical rotary position encoder having 4096 cycles per revolution when operated in 4× mode.

Using the constructed chopper and lock-in amplifier system, a noise floor of $2 \times 10^{-17}$ watts was obtained at room temperature without temperature stabilization. This measured noise floor was found by the inventor to be at least an order of magnitude better than a measurement system utilizing conventional thermally-stabilized photodiode transimpedance amplifiers, conventional research-grade choppers, and conventional research-grade digital-lock-in amplifier systems. Furthermore, the cost for the components was found to be ¼ to ½ the costs of the components for a conventional measurement system utilizing a conventional precision chopper disk, a PLL, and a digital lock-in amplifier.

Applicant has presented certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An apparatus for modulating an incident beam, comprising:
    at least one body comprising a composition that is non-transmissive with respect to said incident beam, said body being rotatable about an axis perpendicular to a surface of said body, said body having a first set of features and at least a second set of features on said surface, said first set of features comprising one or more transmissive features with respect to said incident beam along a first radial path at a first radial distance from said axis, and said second set of features comprising a plurality of data storage features along a second radial path at a second radial distance from said axis; and
    at least one reference sensor disposed over a first position along said second radial path,
    wherein said first and said second radial distances are different, wherein a number of said transmissive features and a number of said plurality of data storage features are relatively prime, wherein said first set of features modulate said incident beam when said body is rotating, and wherein said reference sensor is configured for generating a reference signal based on at least a portion of said plurality of data storage features traversing said first position when said body is rotating.

2. The apparatus of claim 1, wherein said body comprises a disk, and where said axis intersects a center of said disk.

3. The apparatus of claim 1, wherein said at least one body comprises a first body having said first set of features and a second body having said second set of features, wherein said first and second bodies are mechanically coupled to rotate together, and wherein said first set of features and said second body are non-overlapping.

4. The apparatus of claim 3, wherein said first body comprises a first disk, wherein said second body comprises a second disk, and where said axis intersects a center of said first and said second disks.

5. The apparatus of claim 1, wherein each of said plurality of data storage features comprises one or more data storage elements having phase or position information encoded thereon.

6. The apparatus of claim 5, wherein said data storage elements comprise magnetic storage features, interferometric optical pits, reflective features, or transmissive features with respect to said incident beam.

7. The apparatus of claim 5, wherein said phase or position information specifies absolute reference values, indexed-incremental reference values, or an incremental encoding values.

8. The apparatus of claim 1, wherein said one or more transmissive features comprise one or more apertures.

9. A signal measurement apparatus, comprising:
   at least one body comprising a composition that is non-transmissive with respect to said incident beam, said body being rotatable about an axis perpendicular to a surface of said body, said body having a first set of features and at least a second set of features on said surface, said first set of features comprising one or more transmissive features with respect to said incident beam along a first radial path at a first radial distance from said axis, and said second set of features comprising a plurality of data storage features along a second radial path at a second radial distance from said axis; and
   at least one reference sensor disposed over a first position along said second radial path;
   at least one beam input device for sampling said modulated beam; and
   at least one digital signal processing device for calculating at least one of a magnitude and a phase of said signal component of said incident beam based on said modulated beam and a reference signal,
   wherein said first and said second radial distances are different, wherein a number of said transmissive features and a number of said plurality of data storage features are relatively prime, wherein said first set of features modulate said incident beam when said body is rotating, and wherein said reference sensor is configured for generating said reference signal based on at least a portion of said plurality of data storage features traversing said first position when said body is rotating.

10. The apparatus of claim 9, wherein said body comprises a disk, and where said axis intersects a center of said disk.

11. The apparatus of claim 9, wherein said at least one body comprises a first body having said first set of features and a second body having said second set of features, wherein said first and second bodies are mechanically coupled to rotate together, and wherein said first set of features and said second body are non-overlapping.

12. The apparatus of claim 11, wherein said first body comprises a first disk, wherein said second body comprises a second disk, and where said axis intersects a center of said first and said second disks.

13. The apparatus of claim 9, wherein each of said plurality of data storage features comprises one or more data storage elements having phase or position information encoded thereon.

14. The apparatus of claim 13, wherein said data storage elements comprise magnetic storage features, interferometric optical pits, reflective features, or transmissive features with respect to said incident beam.

15. The apparatus of claim 13, wherein said phase or position information specifies absolute reference values, indexed-incremental reference values, or incremental encoding values.

16. The apparatus of claim 9, wherein said one or more transmissive features comprise one or more apertures.

17. A method of operating a signal measurement apparatus comprising at least one rotatable body having a first set of features traveling in a first radial path at a first radial distance for modulating an incident beam and at least a second set of features traveling in a second radial path at a second radial distance, at least one reference sensor disposed over a first position along said second radial path to generate a reference signal based on said second features and, at least one beam input device for sampling a modulated incident beam, the method comprising:
   rotating said body at a first frequency to generate a first modulated beam and a first reference signal;
   sampling a portion said first modulated beam at said beam input device based on said first reference signal;
   generating a modulation waveform based on said portion of first modulated beam and said first reference signal;
   rotating said body at a second frequency to generate a second modulated beam and a second reference signal;
   sampling a portion said second modulated beam at said beam input device based on said second reference signal; and
   computing a phase and magnitude of said second modulated signal based at least on said portion of said second modulated beam and said modulation waveform,
   wherein said first and said second radial distances are selected to be different, and wherein a number of said transmissive features and a number of said plurality of data storage features are selected to be relatively prime.

18. The method of claim 17, further comprising:
   subsequent to said generating, blocking said incident beam and repeating said rotating;
   sampling a portion of a signal detected at said beam input device based on said first reference signal; and
   generating an ambient noise waveform based on said portion of said signal and said reference signal,
   wherein said computing is further based on said ambient noise waveform.

* * * * *